(12) United States Patent
Johnson et al.

(10) Patent No.: US 10,987,945 B2
(45) Date of Patent: *Apr. 27, 2021

(54) THERMOFORMED CUSTOMIZED OBJECT HOLDER FOR DIRECT TO OBJECT PRINTERS

(71) Applicant: Xerox Corporation, Norwalk, CT (US)

(72) Inventors: D. Clay Johnson, Rochester, NY (US); Mark A. Atwood, Rush, NY (US); Timothy P. Foley, Marion, NY (US); Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,231

(22) Filed: May 7, 2019

(65) Prior Publication Data
US 2019/0255862 A1  Aug. 22, 2019

Related U.S. Application Data

(63) Continuation of application No. 15/477,218, filed on Apr. 3, 2017, now Pat. No. 10,308,037.

(51) Int. Cl.
| | | |
|---|---|---|
| B41J 3/407 | (2006.01) |
| B29C 51/42 | (2006.01) |
| B29C 51/26 | (2006.01) |
| B29L 31/00 | (2006.01) |
| B29C 51/10 | (2006.01) |

(52) U.S. Cl.
CPC .......... *B41J 3/4073* (2013.01); *B29C 51/266* (2013.01); *B29C 51/421* (2013.01); *B41J 3/40731* (2020.08); *B29C 51/10* (2013.01); *B29C 2795/007* (2013.01); *B29L 2031/723* (2013.01); *B29L 2031/727* (2013.01); *B29L 2031/767* (2013.01)

(58) Field of Classification Search
CPC .......................... B41J 3/4073; B41M 5/0088
See application file for complete search history.

(56) References Cited

U.S. PATENT DOCUMENTS

| | | |
|---|---|---|
| 9,156,281 B2 | 10/2015 | Dubuit et al. |
| 9,272,815 B2 | 3/2016 | Uptergrove |
| 9,302,506 B2 | 4/2016 | Uptergrove et al. |
| 9,403,383 B1 | 8/2016 | Liu et al. |
| 9,434,180 B2 | 9/2016 | Onodera et al. |
| 9,463,649 B1 | 10/2016 | Liu et al. |
| 9,511,607 B2 | 12/2016 | LeFevre |

(Continued)

FOREIGN PATENT DOCUMENTS

JP    2013-63554 A    4/2013

*Primary Examiner* — Julian D Huffman
(74) *Attorney, Agent, or Firm* — Fox Rothschild LLP

(57) ABSTRACT

A method for printing on a multi-dimensional object may include creating a customized object holder for the multi-dimensional object by heating a thermoforming sheet to a thermoforming temperature, molding the heated thermoforming sheet around at least a portion of a multi-dimensional object to form a holding portion for the multi-dimensional object, creating one or more printable areas on the molded thermoforming sheet, and applying one or more datum points on the molded thermoformed sheet. The one or more datum points may be configured to provide information relating to position of the one or more printable areas to a print system.

15 Claims, 11 Drawing Sheets

(56) References Cited

U.S. PATENT DOCUMENTS

| | | |
|---|---|---|
| 2010/0013880 A1 | 1/2010 | Polk et al. |
| 2010/0186610 A1 | 7/2010 | Polk et al. |
| 2010/0315459 A1 | 12/2010 | Chang et al. |
| 2012/0147074 A1 | 6/2012 | Ikeda et al. |
| 2013/0342592 A1 | 12/2013 | Merz |
| 2014/0029030 A1 | 1/2014 | Miller |
| 2015/0298394 A1 | 10/2015 | Sheinman |

THERMOFORMED CUSTOMIZED OBJECT HOLDER FOR DIRECT TO OBJECT PRINTERS

CROSS REFERENCE TO RELATED APPLICATIONS

This application claims priority to, and is a continuation of U.S. patent application Ser. No. 15/477,218, filed Apr. 3, 2017, the disclosure of which is incorporated herein by reference in its entirety.

BACKGROUND

Distinguishing consumer products, such as beverages, sports memorabilia, fashion accessories etc., from those of competitors in an attractive and interesting manner increases sales and consumption of the product. The visual appeal of a product may be optimized to appeal to a target market by adding designs on the product or the product container that appeal to the consumers. Furthermore, vendors or service providers often like to personalize their products to advertise the services offered to make the item more fun and entertaining, commemorate a special occasion, or the like. However, while printing on objects during the mass-manufacturing process itself is widely known (e.g., ball skins are printed with patterns or logos prior to the ball being completed and inflated during manufacturing), techniques for individualized printing on objects having curved, non-planar, or non-linear surfaces are generally limited and also very expensive.

For example, current systems for printing on an object having curved, non-planar, or non-linear surfaces require an object holder to hold the object steady while its position and/or orientation is carefully varied with respect to a print head by moving the object holder and/or the print head. Such object holders must be custom designed and made for each object (or for each batch of similar objects) to be printed, requiring additional resources and time which significantly adds to the cost of printing. Moreover, custom designed object holders also take up significant storage space.

This document describes devices and methods that are intended to address issues discussed above and/or other issues.

SUMMARY

In some embodiments, a method for printing on a multi-dimensional object may include creating a customized object holder for a multi-dimensional object A method for printing on a multi-dimensional object may include creating a customized object holder for the multi-dimensional object by heating a thermoforming sheet to a thermoforming temperature, molding the heated thermoforming sheet around at least a portion of a multi-dimensional object to form a holding portion for the multi-dimensional object, creating one or more printable areas on the molded thermoforming sheet, and applying one or more datum points on the molded thermoformed sheet. The one or more datum points may be configured to provide information relating to position of the one or more printable areas to a print system.

The method may further include mounting the multi-dimensional object on the customized object holder, attaching the customized object holder to a moving sled of a print system via a mounting structure, and, by a processor, controlling a movement of the moving sled relative to a plurality of print heads. The processor may control the movement of the moving sled by determining, using the one or more datum points, a position of at least one printable area on the multi-dimensional object with respect to the plurality of print heads, and using the determined position to control the movement of the moving sled relative to the plurality of print heads. The method may also include, by the processor, operating the plurality of print heads to eject marking material onto the multi-dimensional object.

In certain embodiments, using the one or more datum points to determine the position of at least one printable area on the multi-dimensional object with respect to the plurality of print heads may include receiving, from the one or more datum points, the registration information corresponding to the one or more printable areas of the multi-dimensional object, and using the registration information to determine the position of the printable areas.

The one or more printable areas on the molded thermoform sheet may be created by removing a part of the thermoforming sheet that forms the holding portion. Alternatively and/or additionally, one or more printable molding the heated thermoforming sheet around at least the portion of the multi-dimensional object such that a second portion of the multi-dimensional object is not covered by the thermoforming sheet. In some embodiments, applying the at least one datum point may include applying optical gratings, color markings, ultraviolet (UV) traces, infrared (IR) traces, thermal traces, or a combination thereof.

In some embodiments, the position of at least one printable area on the multi-dimensional object with respect to the plurality of print heads may be determined by receiving the registration information corresponding to the one or more printable areas of the multi-dimensional object from the at least one datum point, and determining the position of the at least one printable area on the multi-dimensional object using the received datum information.

In various embodiments, the customized object holder may also include an identification tag that includes information about the customized object holder. In one or more embodiments, information relating to the customized object holder may include one or more of the following: a type of object held within the customized object holder, a number of objects held within the customized object holder, information regarding one or more characteristics of an object, information regarding a printable area of an object, information regarding one or more characteristics of the customized object holder, and a location of the object within the customized object holder.

In various embodiments, a system for printing on a multi-dimensional object may include a plurality of print heads, a moving sled configured to receive a customized object holder, an actuator configured to move the moving sled relative to the plurality of print heads, a processing device, and a non-transitory, computer-readable memory containing programming instructions. The system may be configured to create the customized object holder configured to hold a multi-dimensional object, control a movement of the moving sled relative to the plurality of print heads, via the actuator, and operate the plurality of print heads to eject marking material onto a multidimensional object mounted on the moving sled.

In some embodiments, the customized object holder may include a base and at least one datum point. In an embodiment, the customized object holder may also be configured to be mounted on the moving sled via a mounting structure, and the base of the customized object holder may be configured to have a size and a shape that fits within the mounting structure. The mounting structure may be configured to attach to the base along a periphery.

DETAILED DESCRIPTION

Figure 1:
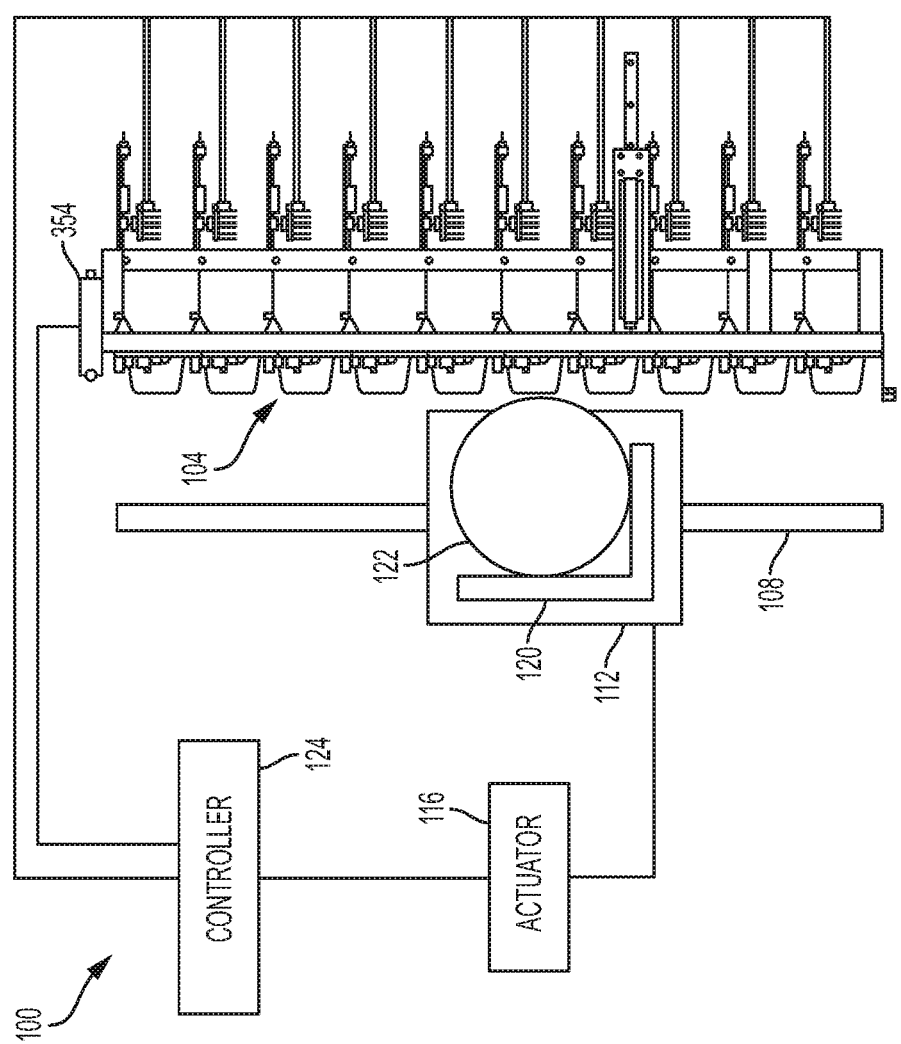
FIG. 1 illustrates an example of a print system for printing on a 3-dimensional object, according to various embodiments.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The term "object" refers to a print media substrate that is made of any multi-dimensional material. An object may include planar, curved, non-planar, or non-linear surfaces. Content may be printed on the print media substrate using toner and/or ink. The object may, for example, include one or more areas comprising characters, and one or more other areas comprising images. Examples of objects which can be printed as described below include, without limitation, round, spherical, rectangular, square, oval, or curved objects such as sporting balls, various types of containers (such as mugs, bottles, etc.), textile materials (such as fabrics used in clothing, hats, footwear, or other apparel), pens, photoframes, ceramics, or the like.

A "print device" or "print engine" is a device that is configured to print content on an object based on digital data, or a multi-functional device in which one of the functions is printing content based on digital data. Example components of a print device include a print head, which may include components such as a print cartridge containing ink, toner or another print material so that the print head can print characters and/or images on the object.

A "print system" is a system of hardware components that include a print device and other components. For example, a printing system may include a marking engine (i.e., the print hardware or print engine) and a digital front end. A digital front end (DFE) is an integrated print workflow management system, including one or more processing devices, capable of receiving and processing print requests and controlling the operation of a print engine to fulfill the print request. The DFE and print engine may be part of a single device (such as a digital printing press), or separate parts of a system of networked devices.

A "processor" or "processing device" is a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

This document describes a customized object holder that may be used to mount one or more objects to a print system via a universal mounting structure when causing a print system to print on the object. The customized object holder may be custom manufactured for each type and/or shape of an object using a thermoforming method such that the object holder at least partially conforms to the shape of the object held within. Such thermoforming method requires minimal design and fabrication time, and is inexpensive compared to the existing methods for manufacturing object holders for a direct to object print system. The customized object holder also includes unique datum points for providing accurate registration of the object(s) held within the object holder. In this system, the universal mounting structure helps in mounting the object holder to a moving sled of a direct to object print system. In this way, printing on a three-dimensional object may be performed without wasting time and resources for designing and manufacturing object holders.

FIG. 1 illustrates an example of a print system for printing on an object. In various embodiments, the print system 100 may include an array or other set of print heads 104, a support member 108, a moving sled 112 movably mounted to the support member 108, an actuator 116 operatively connected to the moving sled 112, an object holder 120 configured to mount to the moving sled 112, and a controller 124 in communication with the print heads 104 and the actuator 116. As shown in FIG. 1, the array of print heads 104 may be arranged in a two-dimensional array, (e.g., a 10×1 array), although other array configurations can be used. In some embodiments, the controller 124 is also operatively connected to an optical sensor 354.

In various embodiments, each print head may be fluidly connected to a supply of marking material (not shown) and is configured to eject marking material received from the supply. In an embodiment, one or more of the print heads may be connected to the same supply. Alternatively and/or additionally, each print head may be connected to its own supply such that each print head may eject a different marking material.

In various embodiments, the support member 108 may be positioned to be parallel to a plane formed by the array of print heads and, as shown in FIG. 1, is oriented so one end of the support member 108 is at a higher gravitational potential than the other end of the support member. This orientation enables the printing system 100 to have a smaller footprint than an alternative embodiment that horizontally orients the array of print heads. While the current embodiment illustrates a single rail acting as a support member 108, it will be understood to those skilled in the art that a plurality of rails disposed parallel to each other are within the scope of this disclosure.

In an embodiment, a moving sled 112 is movably mounted to the support member 108 to enable the moving sled to slide along the support member. In some embodiments, the moving sled 112 may move bi-directionally along the support member. In other embodiments, the support member 108 may be configured to provide a return path to the lower end of the support member to form a track for the movably mounted member. In various embodiments, an actuator 116 may be operatively connected to the moving sled 112 and configured to move the moving sled 112 along the support member 108 such that the object holder 120 connected to the moving sled 112 may pass the array of print heads 104 in one dimension of the two-dimensional array of print heads. In the embodiment, the object holder 120 moves an object 122 along the length dimension of the array of print heads 104. In various embodiments, the gap presented between the objects carried by the object holder 120 and the print heads of the array of print heads 104 is in a range of about five to about six mm.

The controller 124 is configured with programmed instructions stored in a memory in communication with the controller so the controller can execute the programmed instructions to operate components in the printing system 100. In various embodiments, the controller 124 may be configured to provide instruction to the actuator 116 to move the object holder 120 past the array of print heads 104. The controller may also be configured to operate the array of print heads 104 to eject marking material onto objects held by the object holder 120 as the object holder passes the array of print heads 104.

Figure 2:
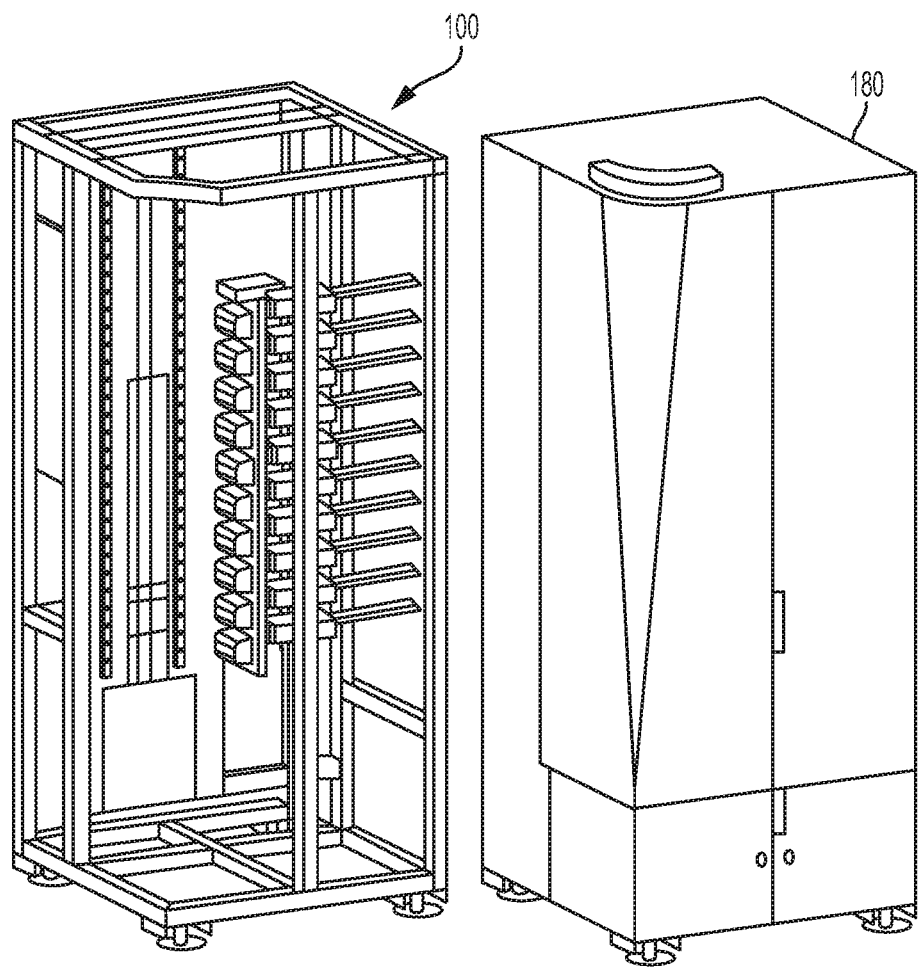
FIG. 2 illustrates an example cabinet within which the print system if FIG. 1 may be installed, according to various embodiments.

In various embodiments, the system configuration shown in FIG. 1 may be housed in a single cabinet 180, as depicted in FIG. 2, and installed in non-production outlets. Once installed, various object holders, as described further below, can be used with the system to print a variety of goods that are generic in appearance until printed.

Figure 3A:
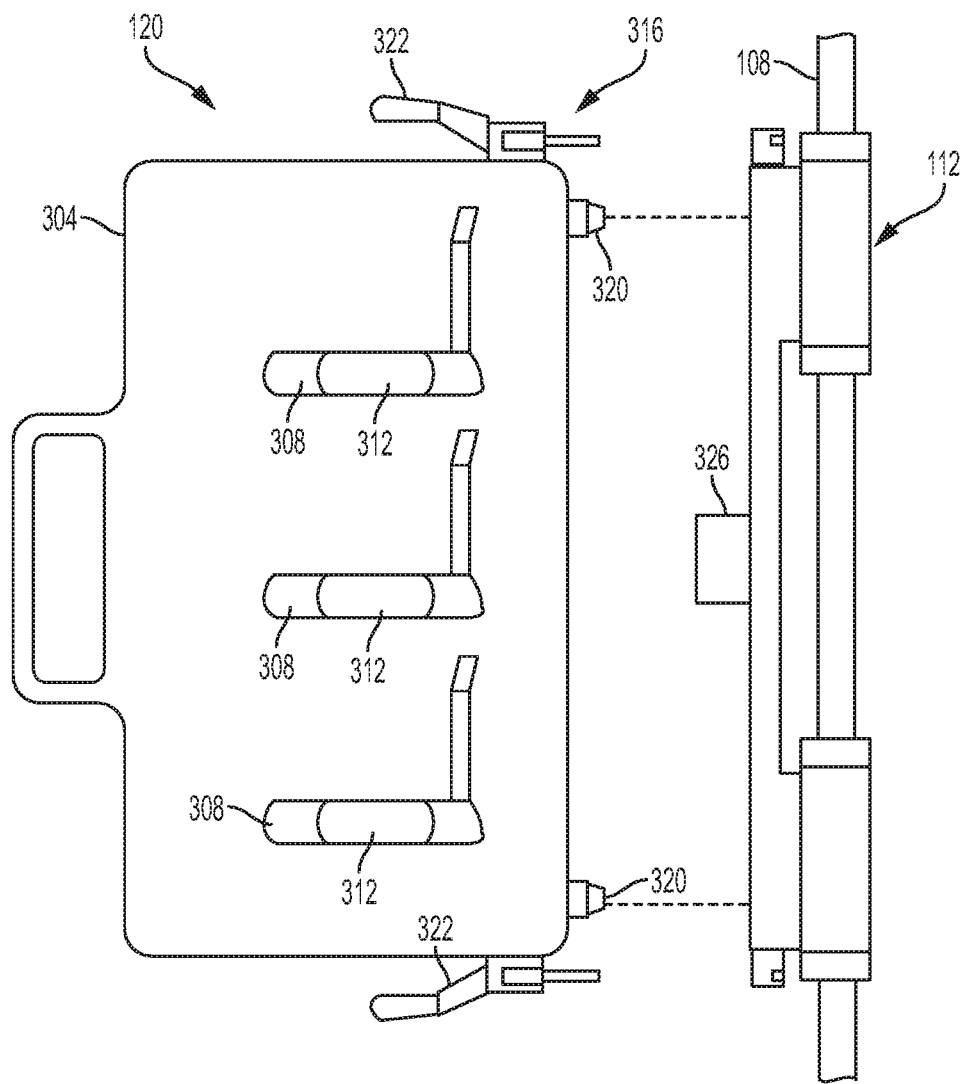
FIGS. 3A and 3B illustrate a front view and a back view, respectively, of a prior art customized object holder for mounting an object in the print system of FIG. 1, according to various embodiments.
Figure 3B:
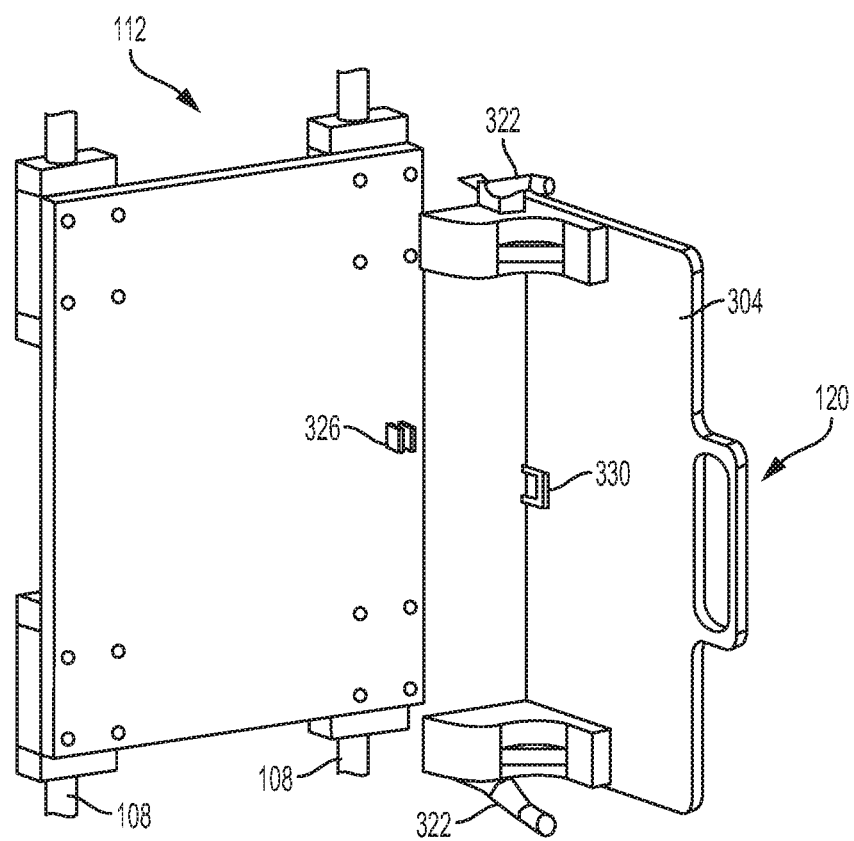

An example of a prior art customized prior art object holder 120 is shown in FIG. 3A. As shown in FIG. 3A, the object holder 120 includes a plate 304 having apertures 308 in which objects 312, which are golf club heads in the figure, are placed for printing. A latch 316 is configured for selectively mounting the object holder 120 to the moving sled 112. The latch 316 includes locating features 320 to aid in properly positioning the object holder 120 for securing the holder to the moving sled 112, which is supported by members 108 as shown in FIG. 3A. Once properly positioned, levers 322 operate the latch 316 to secure the holder 120 to the moving sled 112. FIG. 3B shows a front view of the object holder 120 secured to the moving sled 112. However, as discussed above, an object holder for a print system configured to print on 3D objects must be individually tooled or manufactured for each type of object, which leads to unnecessary consumption of resources, time, and money. This document describes an integrated object packaging system and object holder for use with the print system of FIG. 1 and FIG. 2.

A thermoforming sheet is a sheet, film, plate, or the like of suitable thickness made from a thermoplastic material, which when heated to a suitable forming temperature becomes pliable for further processing such as molding to a desired shape. Thermoforming is a technique that involves heating a thermoforming sheet to a forming temperature, molding the pliable sheet to a desired shape, and curing so that it retains that shape. A typical thermoforming process utilizes two complementary shaped molds. The two molds include a positive mold that defines the convex portion of the shape of the film, and a negative mold that defines the concave portion of the shape of the film (or vice versa). With the heated thermoforming sheet positioned between the molds, the negative mold is pressed into the positive mold, or vice versa, to form the sheet into the shape defined by the molds. The molded sheet is then cured so that it retains the molded shape. Other thermoforming processes utilize vacuum pressure to draw a heated sheet into a mold that has an inner contour with the desired shape (by controlling movement of the sheet using vacuum and/or air pressure). Such thermoforming processes require a separate mold be used to mold each shape and/or size.

Figure 4A:
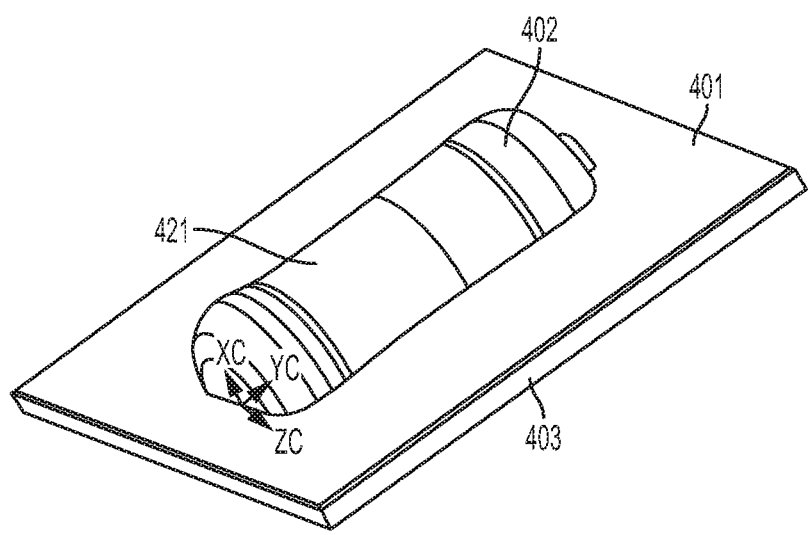
FIGS. 4A and 4B illustrate an example customized object holder mounted on a universal mounting structure for mounting an object in the print system of FIG. 1, according to various embodiments.
Figure 4B:
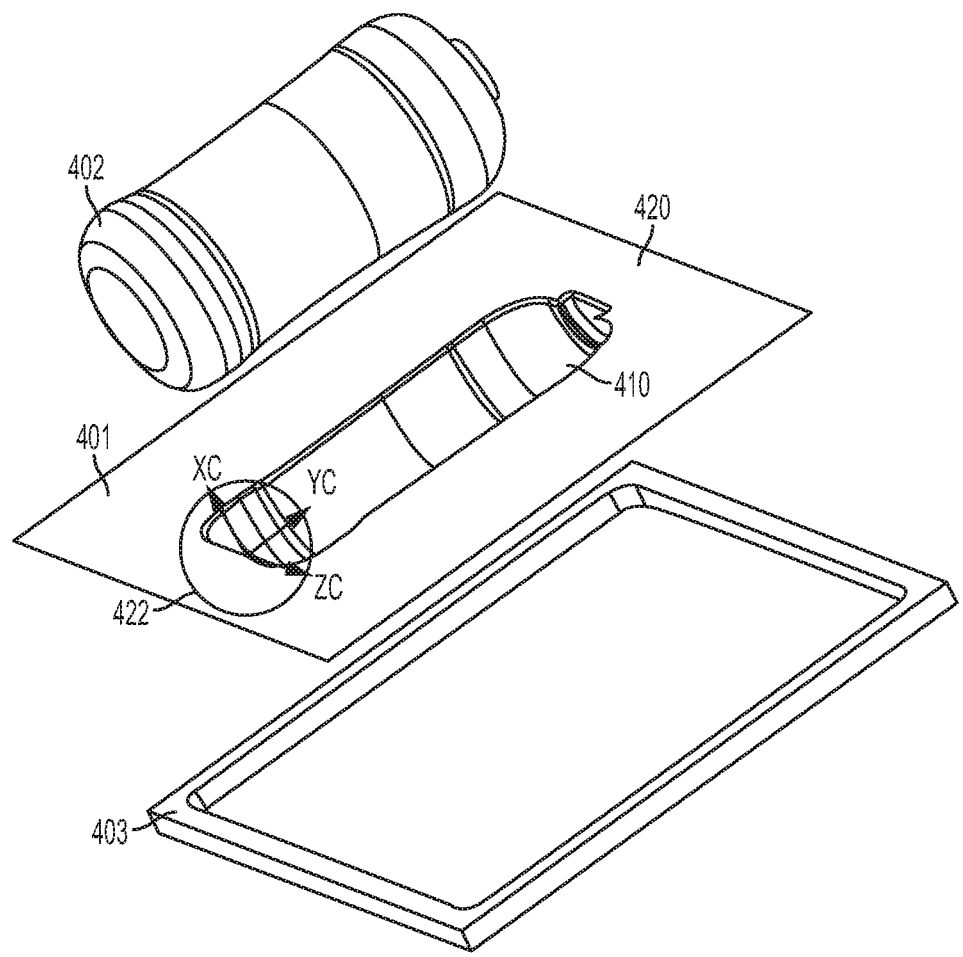

Referring now to FIG. 4A, the current disclosure describes an example of a customized object holder 401 that may be used to hold at least one object 402, and that may be mounted to a moving sled of the print system of FIG. 1, via a universal mounting structure 403. FIG. 4B illustrates an exploded view of the embodiment of FIG. 4A. The customized object holder also includes one or more unique datum points for accurate registration of the one or more objects 402 with respect to print heads of the print system of FIG. 1. It should be noted that while FIG. 4A illustrates one object held within the object holder, the disclosure is not so limited and more than one object (similar or dissimilar) may be held within the customized object holder.

In some embodiments, the customized object holder 401 includes a base 420 and a holding portion 410 configured to securely hold an object 402. As discussed below, with respect to FIG. 6, the object holder 401 is formed from a thermoforming sheet that has been formed to include the base 420 and the holding portion 410. As discussed below, the object 402 is used to mold or shape the thermoforming sheet during the thermoforming process to form at least one pocket in the thermoforming sheet that encapsulates the object 402 and serves as the holding portion 410 of the object holder 401. Therefore, the holding portion 410 closely conforms to the contours and outer shape of the object 402, such that the object 402 is received and securely fits within holding portion 410 and movement is limited by, for example, friction. Limited or restricted movement allows for accurate registration of each object with respect to the print heads during printing. In various embodiments, the base 420 may be provided in configurations that are not planar, such as a box, cylinder, or other types of three-dimensional configurations. The object 402 may be mounted on and/or removed from the object holder 401 by, for example, a snap-fit mechanism, using ties, latches, application of required forces to apply and/or counter the frictional hold of the holding portion on the object etc., or other similar securing means.

In various embodiments, the thermoforming sheet can be a rigid film or a semi-rigid film, and can be clear or transparent, or it can be colored. The thermoforming sheet is selected to have enough rigidity and strength to support one or more objects held within the holding portions. The thermoforming sheet can be made of, without limitation, polystyrenes, polypropylenes, polyethylenes, polyethylene terephthalates, polyvinyl chloride polystyrenes, polyvinylydene chlorides, fluoride resins, polycarbonates, polyamides, polyphenylene oxides, and the like, laminated combinations of thermoplastic and non-thermoplastic materials or other known thermoplastic and non-thermoplastic materials. The thermoforming sheet can be a single layer structure or a multi-layer structure.

In some embodiments, the holding portion 410 is configured to hold an object such that at least a part of the object is not covered (or exposed) by the thermoforming sheet and may form a "printable area" 421. In an embodiment, a printable area may be formed during the thermoforming process. Alternatively and/or additionally, a printable area of an object may be covered by the thermoforming sheet that may be removed before printing on the objects (e.g., by cutting away the thermoforming sheet covering a printable area) (discussed below). In an embodiment, an object may include one or more printable areas. The one or more printable areas are defined (i.e., sized and shaped) such that the holding portion 410 is still able to provide a secure fit for the object 402, and restrict movement of the object 402.

In various embodiments, the base 420 may also include labels, markings, printed text, etchings, marking material, pictures, tabs, and the like ("datum points" 422) for providing accurate registration of the object(s) 402, as well as the printable areas, held within the object holder 401. This allows a controller of a print system to accurately determine the position of one or more objects (and/or each printable area of each object) included in the object holder 401 with respect to the print heads ("registration"). A skew, lateral misalignment or error in the registration of the object holder can lead to errors, such as image and/or color registration errors. In other words, one or more datum points provide location information relating to one or more objects (and/or each printable area of each object) included in the object holder 401. For example, in some embodiments, the base 420 may include ruler markings along one or more sides, grid markings along the entire surface, axial (x, y, and/or z) markings, reference points, or the like for providing location information to the controller of a print system. The datum points 422 may be included in the base 420 before and/or after forming the holding portions (using thermoforming). The datum points 422 may be applied using for example, without limitation, optical gratings, color markings, ultraviolet (UV) traces, infrared (IR) traces, thermal traces, or the like; and the print system may include one or more sensors such as, without limitation, optical sensors, optical encoders, UV sensors, IR sensors, thermal sensors, electrical sensors, or the like. As such, the print controller may receive and/or determine registration information by monitoring the datum points and/or the objects held within an object holder, using one or more sensors.

Alternatively and/or additionally, an object holder 401, may include an identification tag (not shown here) for providing identification and/or information regarding the object holder 401 to a controller of a print system. The information may include registration information. Examples of such identification systems may include, barcodes attached to or printed on the object holder, radio frequency identification (RFID) tags, QR codes, integrated chips, or the like. Examples of information relating to the object holder and the objects held within may include, without limitation, type of objects held within the object holder, the number of objects included in object holder, information regarding the objects (such as shape, dimensions, material, etc.), information regarding the "printable area" of each object (such as shape, dimensions, material, etc.), information regarding a packaging unit (such as shape, dimensions, material, etc.), location of each object (and/or printable area) within the object holder, location of each printable area within the object holder, or the like.

In some embodiments, the base 420 of the object holder 401 is configured to attach to a universal mounting structure 403. FIGS. 4A and 4B illustrate an example universal mounting structure 403 shaped as a frame that surrounds and attaches to the periphery of the base 420 of the object holder 401. The universal mounting structure may be attached to the periphery of the base 420 using various attachment means such as, without limitation, adhesives, nut and bolts, fastening means, pins, grooves or slots in the universal mounting structure for receiving complementary flanges/tabs included in the base (or vice versa), or the like. Hence, the base 420 of the object holder 401 generally has dimensions, thickness, shape, etc. that conforms to the shape of the universal mounting structures 403, and can be attached and/or mounted to the universal mounting structure 403 such that customized object holders created for different objects may be mounted on the universal mounting structure 403. The universal mounting structure 403 is configured such that it does not hinder or obstruct the operation of the print system and/or printing on the printable areas of the objects held by the object holder. As such, it will be understood to those skilled in the art that while the current disclosure describes a frame shaped universal mounting structure configured to peripherally surround the base of an object holder, other shapes and configurations are within the scope of this disclosure.

In some embodiments, the universal mounting structure 403 may include various features such as bores and apertures to facilitate securement of other device components thereto and/or for securing the mounting structure 403 to a moving sled of a print system (such as those described above with respect to FIGS. 3A and 3B). In an embodiment, the universal mounting structure 403 may also include various features such as hinges or other rotational means for changing the orientation of the universal mounting structure 403 with respect to the moving sled of the print system.

Figure 5:
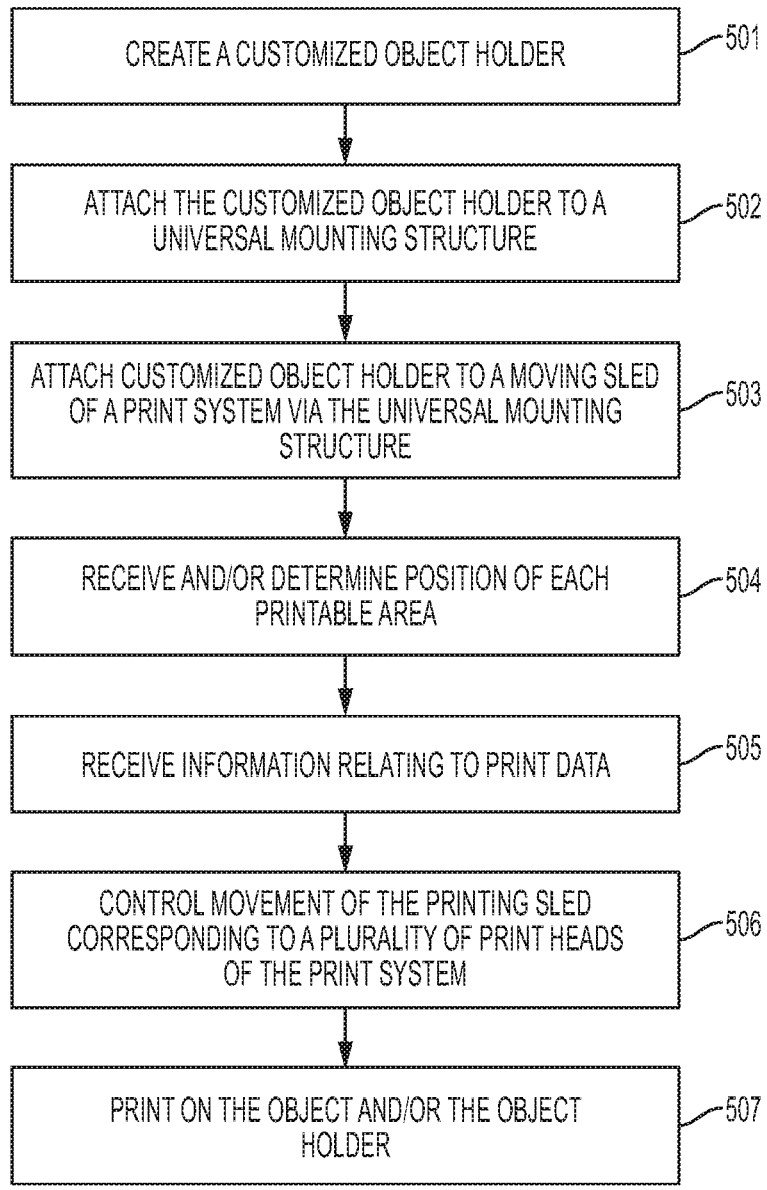
FIG. 5 depicts a flowchart illustrating an example method of a using a customized object holder for printing on an object, according to various embodiments.

Referring now to FIG. 5, a flowchart describing an example method for creating a customized object holder and using the customized object holder for printing on an object is illustrated.

Figure 6:
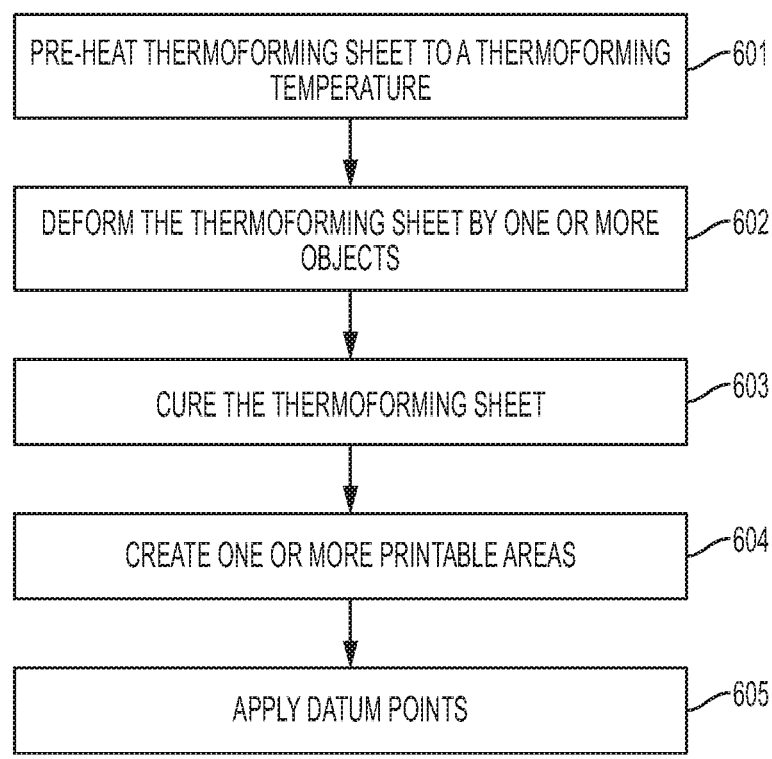
FIG. 6 illustrates a flowchart illustrating an example method of creating a customized object holder, according to an embodiment.

In step 501, a customized object holder is created using the steps described in FIG. 6, and an object is mounted on the customized object holder. As shown in FIG. 6, first a thermoforming sheet for creating an object holder is preheated to a thermoforming temperature (step 601), such as using an oven. The forming temperature may be any suitable temperature for the type of material used for the thermoforming sheet that is capable of causing the thermoforming sheet to become pliable and capable of being stretched and deformed without tearing or breaking and that does not burn or blister the thermoforming sheet. The thermoforming sheet may be heated from both sides or may be heated from just one side, e.g., the top or the bottom.

One or more objects are then properly aligned and moved into engagement with each other such that the thermoforming sheet is deformed, i.e., the thermoforming sheet is molded (step 602) by the object(s) and partially surrounds the object(s) by taking on a thermoformed shape that conforms to a shape of the object(s). The object(s) are therefore used as a mold to shape the thermoforming sheet and form a holding portion(s) in the thermoforming sheet having a form fit that closely surrounds the object(s) and conforms to the outer shape and contours of the object(s). To thermoform the thermoforming sheet, application of mechanical forces, pressure, vacuum, or the like may used to cause the thermoforming sheet to surround and closely conform to the object(s).

The thermoforming sheet is then cured (step 603) around the objects(s) so that the sheet can retain the thermoformed shape. The thermoforming sheet may be cured in any suitable manner appropriate for the materials used. Examples of types of curing that may be used include radiant heating, cooling, forced air, microwave dryers and combinations of these types.

Figure 4C:
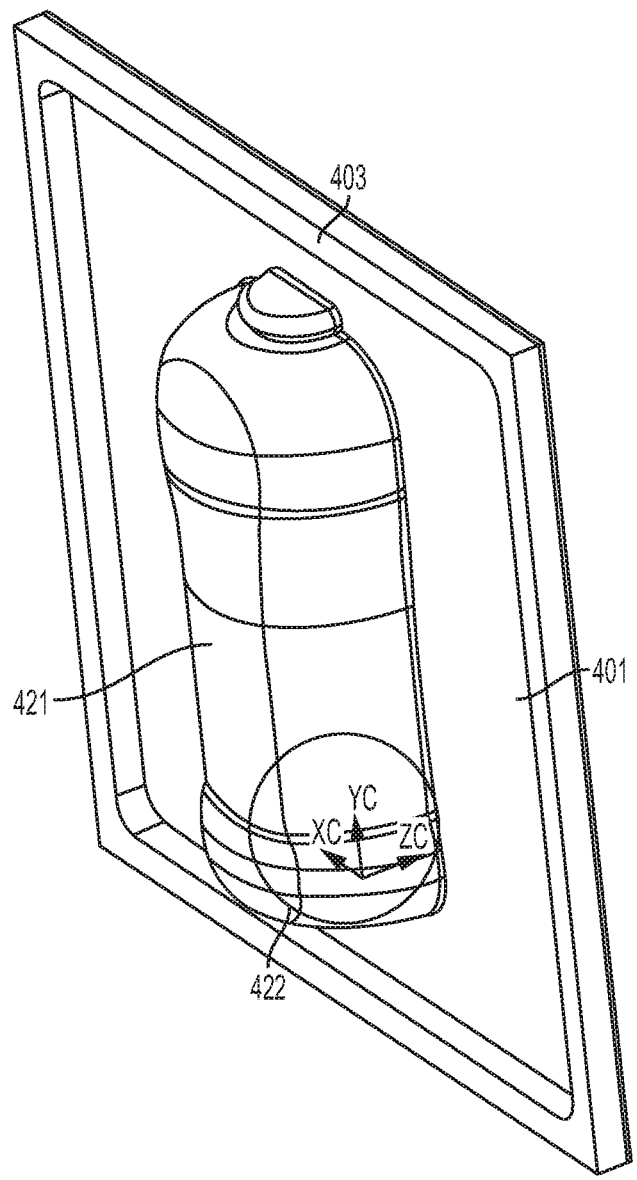
FIGS. 4C and 4D illustrate another example customized object holder mounted on a universal mounting structure for mounting an object in the print system of FIG. 1, according to various embodiments.
Figure 4D:
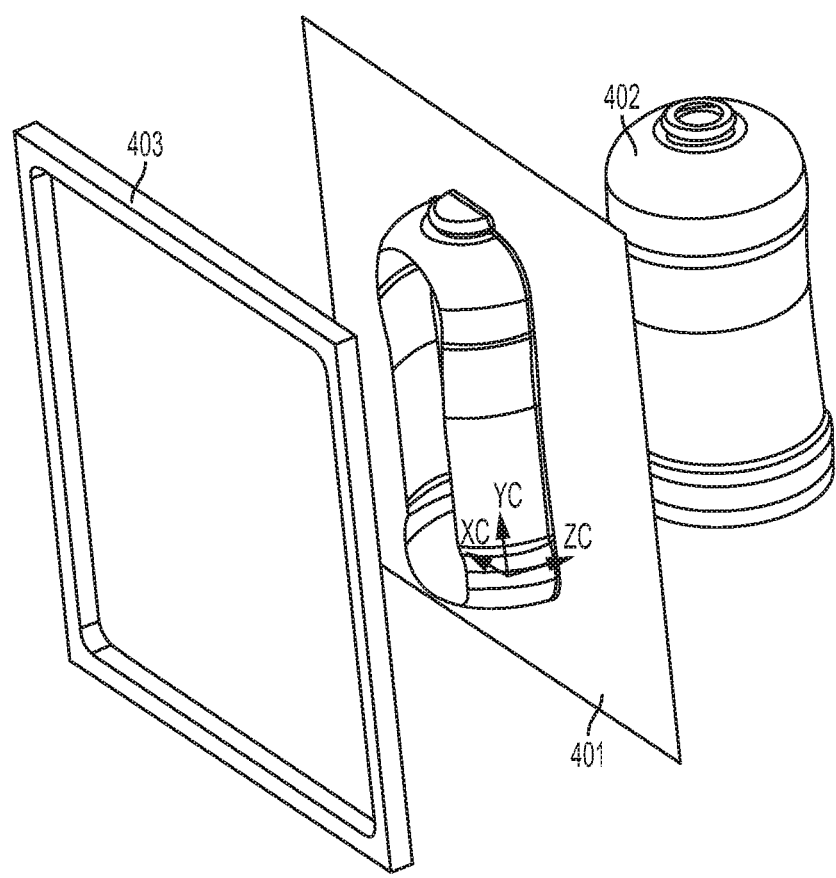

One or more printable areas for the object(s) may then be created (step 604) on the cured thermoformed sheet. In certain embodiments, the printable areas may be automatically created when the thermoforming sheet is cured. For example, as shown in FIGS. 4A and 4B, curing the thermoforming sheet using the object(s) as a mold creates printable area 421 which is an area of the object 402 not covered by the object holder 401, and may be printed upon. Alternatively and/or additionally, one or more printable areas may be created by cutting out portions of the cured thermoforming sheet that form the holding portion discussed above. For example, as shown in FIGS. 4C and 4D, printable area 421 is created by removing a portion of the thermoforming sheet that is molded around the object 402 and that forms the holding portion (FIG. 4D is an exploded view of the embodiment shown in FIG. 4C). Any suitable cutting process may be employed for removal of portions of the thermoforming sheet such as, without limitation, die cutting, laser cutting, saw, blade, ultrasonic, or the like.

It should be noted that the above thermoforming process for creating a customized object holder may be performed using any now or hereafter know thermoforming systems or components that may form a part of the printing system described in FIG. 1, and/or may be separate and distinct from the printing system described in FIG. 1. Other now or hereafter known manufacturing processes may also be used to create the customized object holder in association with and/or as a substitute to thermoforming. Furthermore, a customized object holder once created may be used for printing on other similar objects.

In step 605, one or more datum points may be applied to and/or created on the customized object holder, as discussed above with respect to FIG. 4A.

Referring back to FIG. 5, in step 502, the customized object holder including the object(s) held within is attached to a universal mounting structure. The universal mounting structure is then used to mount the customized object holder onto the moving sled of a print system (step 503).

Next, the print system may receive and/or determine (step 504) the position of each printable area (i.e., registration information) associated with each object held within the object holder mounted on the mounting structure with respect to the print heads (i.e., register each printable area). In some embodiments, the print system may determine the registration information using a sensor (e.g., optical sensor) to monitor one or more datum points and the object(s) and/or printable area(s). For example, the print system may monitor optical grading on the object holder using an optical encoder to determine the position of each object and/or printable area. In various embodiments, the print system may recognize printable area(s) as areas on the object(s) and/or portions of the object holder that are not covered by a thermoforming sheet.

Additionally and/or alternatively, the print system may receive and/or determine the registration information by first receiving identifying information corresponding to the object holder. In an embodiment, the system may receive the identifying information by, for example, scanning a barcode or like attached to the object holder, from an RFID tag, using optical character recognition (OCR), scanning an image attached to the object holder, or the like. Examples of identifying information may include, without limitation, stock keeping unit number (SKU), a product code (UPC), an International Article Number (EAN), model numbers, product manufacturer name, product name, or the like. The print system may then retrieve more information relating to the object holder and the objects held within using the identifying information. For example, the print system may access a database such as a product registration database and retrieve the above information using the identified information. Examples of information relating to the object holder and the objects held within may include, without limitation, type of objects held within the object holder, the number of objects included in object holder, information regarding the objects (such as shape, dimensions, material, etc.), information regarding the "printable area" of each object (such as shape, dimensions, material, etc.), information regarding a packaging unit (such as shape, dimensions, material, etc.), location of each object (and/or printable area), or the like.

In step 505, the print system may receive information relating to print data to be printed on each printable area and may control the movement (step 506) using the registration information and the print data information.

In step 505, the print system may print on the objects as discussed above with respect to FIG. 1.

It should be noted that while the above disclosure describes embodiments that include a mounting structure movable along the length dimension of an array of print heads, and the print heads are stationary, it will be understood to those skilled in the art that the print heads may also be movable to provide a relative motion between the print heads and the mounting structure. Alternatively, the mounting structure may be stationary and only the array of print heads may be movable.

Figure 7:
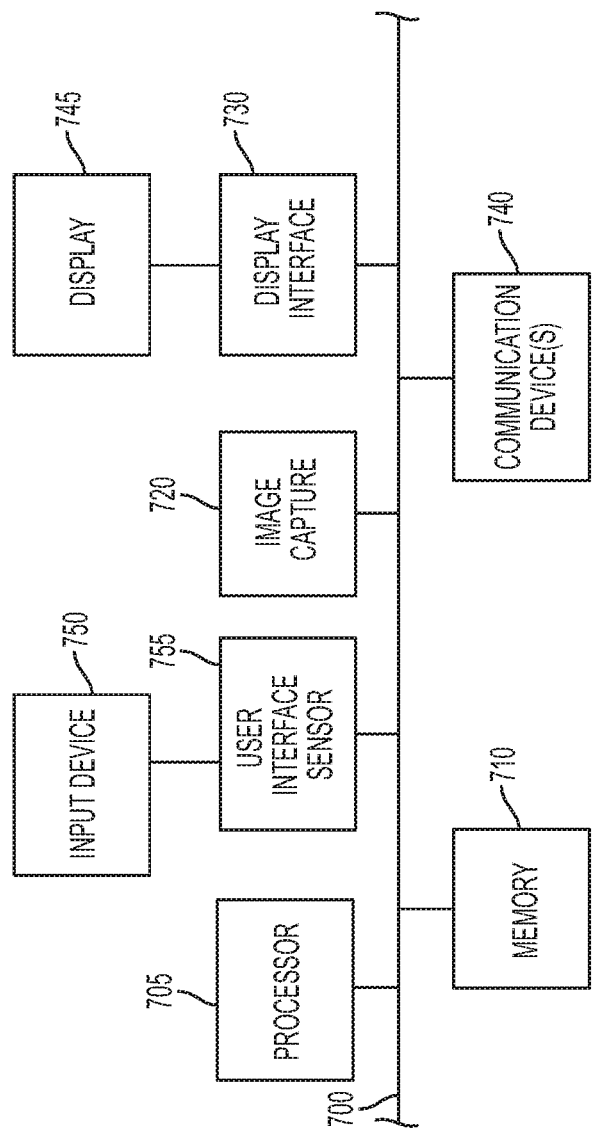
FIG. 7 depicts various embodiments of one or more electronic devices for implementing the various methods and processes described herein.

FIG. 7 depicts an example of internal hardware that may be included in any of the electronic components of the print system, such as the controller, or the print device. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 710. A memory device may include a single device or a collection of devices across which data and/or instructions are stored.

An optional display interface 730 may permit information from the bus 700 to be displayed on a display device 745 in visual, graphic or alphanumeric format. An audio interface and audio output (such as a speaker) also may be provided. Communication with external devices may occur using various communication devices 740 such as a transmitter, transceiver, antenna, communications port or a similar device. A communication device 740 may be attached to a communications network, such as the Internet, a local area network or a cellular telephone data network.

The hardware may also include a user interface sensor 755 that allows for receipt of data from input devices 750 such as a keyboard, a mouse, a joystick, a touchscreen, a remote control, a pointing device, a video input device and/or an audio input device. Data also may be received from an image capturing device 720, such as a scanner or camera.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for printing on a multi-dimensional object, the method comprising, creating a customized object holder for holding the multi-dimensional object during printing by:
  heating a thermoforming sheet to a thermoforming temperature;
  molding the heated thermoforming sheet around at least a portion of a multi-dimensional object to form a holding portion for the multi-dimensional object;
  creating one or more printable areas on the molded thermoforming sheet by removing a art of the thermoforming sheet that forms the holding portion;
  applying one or more datum points on the molded thermoformed sheet, wherein the one or more datum points are configured to provide information relating to position of the one or more printable areas to a print system.

2. A method of claim 1, further comprising:
  mounting the multi-dimensional object on the customized object holder;
  attaching, via a mounting structure, the customized object holder to a moving sled of a print system;
  by a processor, controlling a movement of the moving sled relative to a plurality of print heads by:
    determining, using the one or more datum points, a position of at least one printable area on the multi-dimensional object with respect to the plurality of print heads, and
    using the determined position to control the movement of the moving sled relative to the plurality of print heads; and
  by the processor, operating the plurality of print heads to eject marking material onto the multi-dimensional object.

3. The method of claim 2, wherein determining, using the one or more datum points, the position of at least one printable area on the multi-dimensional object with respect to the plurality of print heads comprises:
  receiving, from the one or more datum points, the registration information corresponding to the one or more printable areas of the multi-dimensional object; and
  determining the position of the at least one printable area on the multi-dimensional object using the received registration information.

4. The method of claim 1, wherein creating the one or more printable areas on the molded thermoform sheet further comprises molding the heated thermoforming sheet around at least the portion of the multi-dimensional object such that a second portion of the multi-dimensional object is not covered by the thermoforming sheet.

5. The method of claim 1, wherein applying the at least one datum point comprises applying one or more of the following: optical gratings, color markings, ultraviolet (UV) traces, infrared (IR) traces, thermal traces, or a combination thereof.

6. The method of claim 1, further comprising creating the customized object holder to include an identification tag that includes information relating to the customized object holder.

7. The method of claim 6, wherein the information relating to the customized object holder comprises one or more of the following:
  a type of object held within the customized object holder;
  a number of objects held within the customized object holder;
  information regarding one or more characteristics of an object;
  information regarding a printable area of an object;
  information regarding one or more characteristics of the customized object holder; or
  a location of the object within the customized object holder.

8. A system for printing on a multi-dimensional object, the system comprising:
  a plurality of print heads;
  a moving sled configured to receive a customized object holder;
  an actuator configured to move the moving sled relative to the plurality of print heads;
  a processing device; and
  a non-transitory, computer-readable memory containing programming instructions that are configured to cause the processing device to:
    create the customized object holder that is configured to hold a multi-dimensional object by causing a thermoforming system to:
      heat a thermoforming sheet to a thermoforming temperature,
      mold the heated thermoforming sheet around at least a portion of the multi-dimensional object to form a holding portion for the multi-dimensional object,
      create the one or more printable areas on the molded thermoforming sheet by removing a part of the thermoforming sheet that forms the holding portion, and
      apply at least one datum point on the molded thermoformed sheet, wherein the at least one datum point is configured to provide information relating to position of the one or more printable areas to the processing device,
    control a movement of the moving sled relative to the plurality of print heads, via the actuator, and
    control a movement of the moving sled relative to the plurality of print heads, via the actuator, and
    operate the plurality of print heads to eject marking material onto a multidimensional object mounted on the moving sled.

9. The system of claim 8, wherein the customized object holder further comprises a base.

10. The system of claim 8, wherein:
  the customized object holder is configured to be mounted on the moving sled via a mounting structure; and
  the base of the customized object holder is configured to have a size and a shape that fits within the mounting structure.

11. The system of claim 8, wherein the mounting structure is configured to attach to the base along a periphery.

12. The system of claim 8, wherein the instruction to create the one or more printable areas on the molded thermoform sheet further comprise instructions to mold the heated thermoforming sheet around at least the portion of the multi-dimensional object such that a second portion of the multi-dimensional object is not covered by the thermoforming sheet.

13. The system of claim 8, wherein the instruction to apply the at least one datum point comprise instructions to apply one or more of the following: optical gratings, color markings, ultraviolet (UV) traces, infrared (IR) traces, thermal traces, or a combination thereof.

14. The system of claim 8, wherein the instructions to control the movement of the moving sled relative to the plurality of print heads, further comprise instructions to:
  determine, using the at least one datum point, a position of at least one printable area on the multi-dimensional object with respect to the plurality of print heads, and
  use the determined position to control the movement of the moving sled relative to the plurality of print heads.

15. The system of claim 14, wherein the instructions to determine, using the at least one datum point, the position of at least one printable area on the multi-dimensional object with respect to the plurality of print heads further comprise instructions to:
  receive, from the at least one datum point, the registration information corresponding to the one or more printable areas of the multi-dimensional object; and
  determine the position of the at least one printable area on the multi-dimensional object using the received registration information.

* * * * *